(12) United States Patent
Gabbianelli et al.

(10) Patent No.: US 7,654,571 B2
(45) Date of Patent: Feb. 2, 2010

(54) JOINING STRUCTURE FOR SIDE MEMBERS AND CROSS MEMBERS IN CHASSIS FRAMES

(75) Inventors: Gianfranco Gabbianelli, Troy, MI (US); Hiroshi Uchiyama, Chiba (JP)

(73) Assignee: Magna International Inc., Aurora, Ontario (CA)

( * ) Notice: Subject to any disclaimer, the term of this patent is extended or adjusted under 35 U.S.C. 154(b) by 245 days.

(21) Appl. No.: 11/720,552

(22) PCT Filed: Feb. 23, 2006

(86) PCT No.: PCT/CA2006/000271
§ 371 (c)(1),
(2), (4) Date: May 31, 2007

(87) PCT Pub. No.: WO2006/089421
PCT Pub. Date: Aug. 31, 2006

(65) Prior Publication Data
US 2008/0169633 A1      Jul. 17, 2008

(51) Int. Cl.
*B62D 21/00* (2006.01)
(52) U.S. Cl. .................................. 280/781
(58) Field of Classification Search .......... 280/781, 280/785, 796–798, 800; 29/897.2; 296/29, 296/205; 403/240, 255, 263
See application file for complete search history.

(56) References Cited

U.S. PATENT DOCUMENTS

| | | | |
|---|---|---|---|
| 1,846,567 A * | 2/1932 | Murray, Jr. ................. 280/796 |
| 1,893,721 A | 1/1933 | Walhberg | |
| 2,107,382 A * | 2/1938 | Maddock .................... 280/796 |
| 2,113,403 A * | 4/1938 | Harmon ...................... 280/796 |
| 2,174,922 A * | 10/1939 | Kuiper ....................... 280/796 |
| 2,194,349 A | 3/1940 | Almdale | |
| 3,520,049 A * | 7/1970 | Lysenko et al. ............. 219/617 |
| 4,810,011 A | 3/1989 | Hashimoto | |
| 5,071,174 A | 12/1991 | Griffin et al. | |
| 5,195,779 A | 3/1993 | Aoyama et al. | |
| 5,205,587 A | 4/1993 | Orr | |

(Continued)

FOREIGN PATENT DOCUMENTS

WO    WO 02/094638 A1    11/2002

*Primary Examiner*—Paul N Dickson
*Assistant Examiner*—Robert A Coker
(74) *Attorney, Agent, or Firm*—Harness, Dickey & Pierce, P.L.C.; Donald G. Walker

(57) ABSTRACT

A structure for joining a cross member (2) to a side member (1) of a chassis frame, wherein a flange (4) is formed integrally at an end of the cross member via a flare (3), an extension member (5) inserted into the end of the cross member (2) to project from the afore-mentioned flange (4) is welded to the flare (3), the extension member (5) is passed through an inside hole (9i) formed in an inside part (8i) in the width direction of the vehicle in the closed-section part of the side member (1) and welded to an outside hole (9o) formed in an outside part (8o) in the width direction of the vehicle, and the outer periphery of the flange (4) is welded to the inside part (8i) in the width direction of the vehicle. The closed-section part (8) is formed in a rectangular shape, and the top and bottom parts of the periphery of the flange (4) are located near top and bottom bends (12) of the closed-section part (8).

16 Claims, 8 Drawing Sheets

U.S. PATENT DOCUMENTS

| | | |
|---|---|---|
| 5,458,393 A | 10/1995 | Benedyk |
| 5,865,362 A * | 2/1999 | Behrmann et al. ........ 228/114.5 |
| 6,205,736 B1 | 3/2001 | Amborn et al. |
| 6,255,631 B1 * | 7/2001 | Kichline et al. ............. 219/617 |
| 6,302,478 B1 * | 10/2001 | Jaekel et al. ................. 296/205 |
| 6,308,412 B1 | 10/2001 | Christofaro et al. |
| 6,523,876 B1 * | 2/2003 | Durand ...................... 296/35.1 |
| 6,634,673 B1 | 10/2003 | Verhaeghe |
| 6,813,818 B2 | 11/2004 | Schmidt |
| 7,127,816 B2 * | 10/2006 | Kiehl ......................... 29/897.2 |
| 7,144,040 B2 * | 12/2006 | Kiehl et al. .................. 280/785 |
| 2003/0214155 A1 * | 11/2003 | Kiehl et al. .................. 296/204 |

* cited by examiner

[PRIOR ART]

JOINING STRUCTURE FOR SIDE MEMBERS AND CROSS MEMBERS IN CHASSIS FRAMES

FIELD OF THE INVENTION

The present invention relates to a structure for joining cross members to side members of chassis frames.

BACKGROUND OF THE INVENTION

As shown in FIG. 7, a ladder-type chassis frame f constituted by welding a plurality of cross members c between a pair of side members s and s is employed in the chassis frame of pickup trucks and SUVs and the like (Japanese Patent Application Laid Open No. 2002-33772, Japanese Patent Application Laid Open No. H8-282532 and the like). As shown in FIG. 8 and FIG. 9, a closed-section side member s having holes hi and ho formed therein on the inside part si in the width direction of the vehicle and on the outside part so in the width direction of the vehicle respectively, and a cylindrical cross member c passed therethrough and welded in these holes hi and ho, is known as a structure joining the aforementioned cross member c to the aforementioned side member s. In the figure, w1 is the first weld bead on the inside, and W2 is the second weld bead on the outside.

Simulations and experiments related to a chassis frame having such a joined structure showed stress concentration above and below the first weld bead w1, and the possibility of cracks k1 and k2 occurring therein, due to various inputs (twist input, bending input, vehicle weight and the like) from the wheels and the like during running of the vehicle. Crack k1 occurs above and below the join between the first weld bead w1 and cross member c, and crack k2 occurs above and below the join between the first weld bead w1 and side member s. Only the top crack is shown in FIG. 8. To suppress occurrence of these cracks k1 and k2, plate thickness of members s and c must be increased, resulting in disadvantages in cost and weight.

The inventor has therefore developed another structure for joining side members s and cross members c as shown in FIG. 10 and FIG. 11. In this joining structure, a reinforcing member r comprising a cylindrical part r1, a flared part r2, and a flange part r3 is fitted over the outer periphery of the cross member c and located and welded at a prescribed distance from the end of the cross member c on the inside in the width direction (first weld bead w1'), the end of the cross member c is passed through a hole hi formed on the inside part si of a closed-section side member s in the width direction of the vehicle and through a hole ho formed on the outside part so of the closed-section side member s in the width direction of the vehicle, the outer periphery of the flange part r3 is welded to the inside part si in the width direction of the vehicle (second weld bead w2'), and the end of the cross member c is welded to the hole ho (third weld bead w3'). This joining structure is not known publicly in documentation prior to this application.

According to this joining structure, the top and bottom of the second weld bead w2' are located near the top and bottom bends bu and bd of the side member s, and thus occurrence of cracking in the second weld bead w2' can be suppressed due to inhibition of deformation caused by the afore-mentioned inputs, absorption of load resulted from the deformation of the flared part r2, and the ability to alleviate stress occurring with increased length of the second weld bead w2'. In other words, in the type shown in FIG. 8 and FIG. 9, the top and bottom of the first weld bead w1 where stress concentration occurs due to the afore-mentioned inputs are located on the flat part fa of the inside part si in the width direction of the vehicle, and thus deformation readily occurs, stress concentration increases, and the afore-mentioned crack k2 occurs. Whereas, in the type shown in FIG. 10 and FIG. 11, the top and bottom of the second weld bead w2' where stress concentration occurs are located near the bends bu and bd of greater planar rigidity than the flat part fa, and thus deformation is inhibited, progression of stress concentration associated with deformation is suppressed, and occurrence of cracking can be suppressed.

However, in relation to the first weld bead w1, when the length of the cylindrical part r1 is short, the welding situation approaches that of the first weld bead w1 of the type shown in FIG. 8 and FIG. 9 where the length of the afore-mentioned cylindrical part r1 is zero, and thus crack k1' occurs for the same reason as crack k1. On the other hand, when the aforementioned cylindrical part r1 is made longer, the bearing area of the cylindrical part r1 in relation to the cross member c is enlarged, and thus the load borne by the first weld bead w1' is reduced and occurrence of crack k1' can be suppressed. However, the load on the remaining second and third weld beads w2' and w3' respectively increases. While the second weld bead w2' joins the cross member c and the side member s indirectly via a reinforcing member r, the third weld bead w3' joins directly the cross member c and the side member s, and thus the force transmitted from the cross member c to the side member s applies a greater load to the third weld bead w3' directly than is transmitted to the second weld bead w2' via the reinforcing member r, and cracking occurs in the third weld bead w3'.

SUMMARY OF THE INVENTION

An object of the present invention is the provision of a structure joining side members and cross members in a chassis frame able to suppress occurrence of cracking in welds due to various inputs during running of the vehicle.

According to one aspect of the invention, there is provided a structure for joining a cross member to a side member of a chassis frame. A cross member has a flared flange integrally formed at an end of the cross member and extending circumferentially thereabout. An extension member is inserted into the end of the cross member to project lengthwise of the cross member. The extension member is welded to the cross member. A side member has a closed cross section, having an inside hole formed in an inside part of the side member and an outside hole formed in an outside part of the side member. The extension member is passed through the inside hole and the outside hole and welded to outside part of the side member, and the flange is welded to the inside part of the side member.

According to another aspect of the invention, there is provided a chassis for a motor vehicle. The chassis frame has a cross member with a flared flange integrally formed at an end of the cross member and extending circumferentially thereabout. An extension member is inserted into the end of the cross member to project lengthwise of the cross member. The extension member is welded to the cross member. A side member of the chassis frame has a closed cross section, having an inside hole formed in an inside part of the side member and an outside hole formed in an outside part of the side member. The extension member is passed through the inside hole and the outside hole and welded to outside part of the side member, and the flange is welded to the inside part of the side member.

According to another aspect of the invention, there is provided a method for joining cross members to side members in a chassis frame. The method includes the steps of:

forming a first flange integrally at a first end of a cross member;

inserting a first extension member into the first end of the cross member to project lengthwise from the cross member;

welding the first extension member to the cross member;

providing a first side member having a closed cross-section;

forming an inside hole in an inside part of the first side member and an outside hole formed in an outside part of the first side member;

passing the first extension member through the inside hole and through the outside hole;

welding the first extension member to the outside part of the first side member; and welding the first flange to the inside part of the first side member.

According to the joining structure for side members and cross members of the chassis frame according to the present invention, dangerous sites in terms of strength can be eliminated without loss of joined rigidity, and thus occurrence of cracking in welds due to inputs during running of the vehicle can be suppressed. As a result, a chassis frame having required rigidity and strength and yet being light in weight can be obtained at low cost.

BACKGROUND OF THE INVENTION

Figure 1:
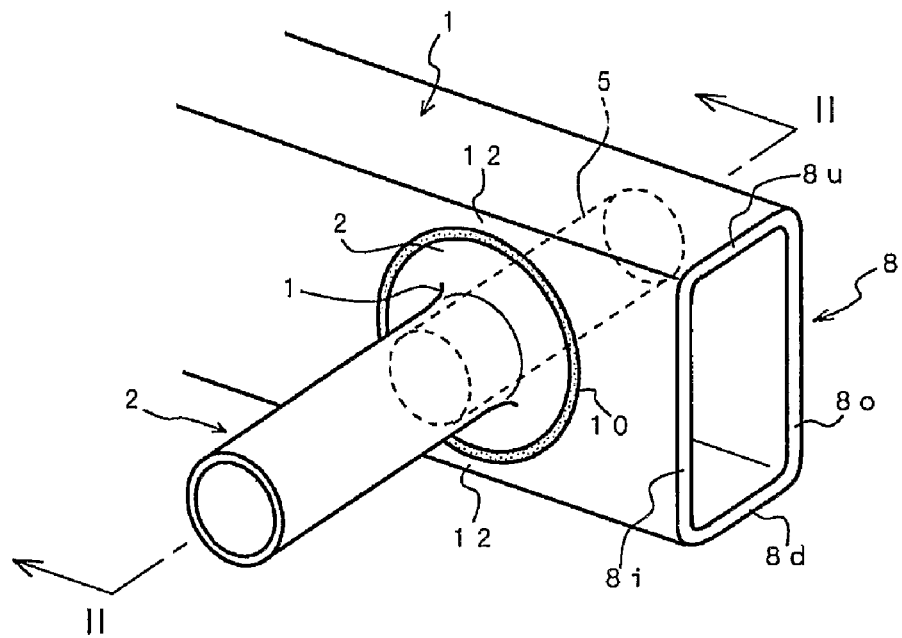
FIG. 1 is a perspective view showing a joining structure for side members and cross members of a chassis frame according to the present embodiment.
Figure 2:
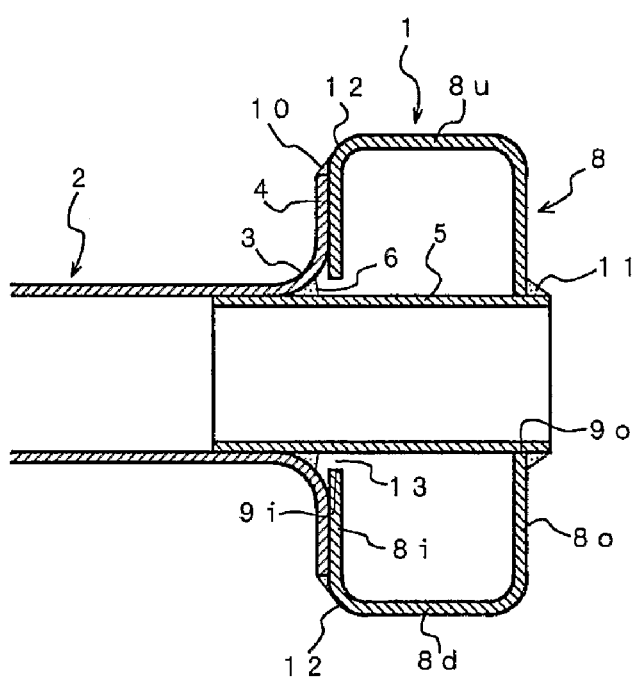
FIG. 2 is a cross-sectional view taken along II-II in FIG. 1.
Figure 7:
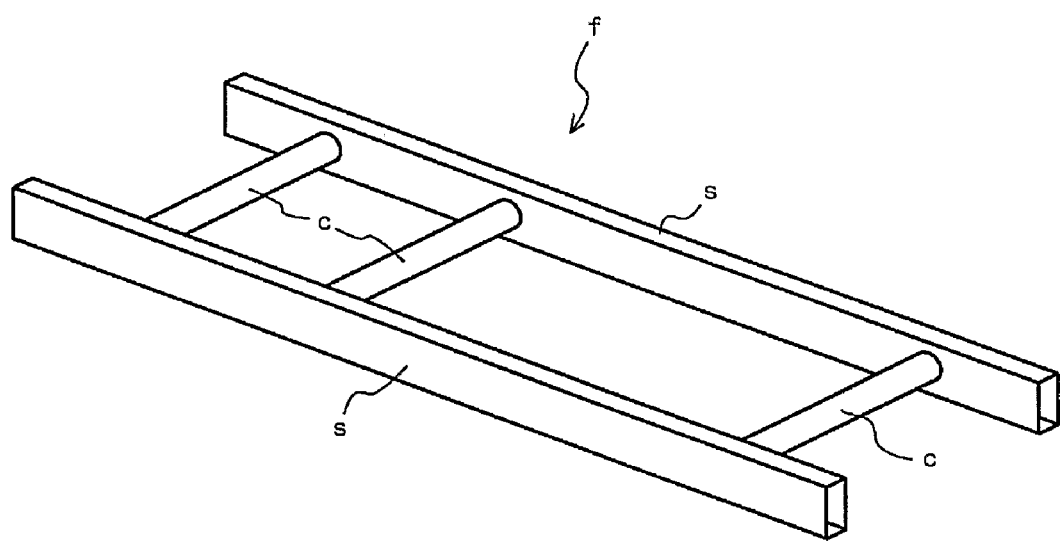
FIG. 7 is a perspective view showing the chassis frame schematically.

The joining structure for side members 1 and cross members 2 of a chassis frame according to an embodiment are shown in FIG. 1 and FIG. 2. The side members 1 are located opposite each other at a prescribed distance in the width direction of the vehicle. Cross members 2 are located to span the opposite first and second side members 1 (see FIG. 7). Preferably, the first and second side members are mirror images of each other. Improvements as explained below are made to the joining structure for side members 1 and cross members 2 to eliminate dangerous sites in terms of strength (areas of weakness) without loss of joined rigidity, and to suppress occurrence of cracking in welds due to inputs during running of the vehicle.

Figure 4:
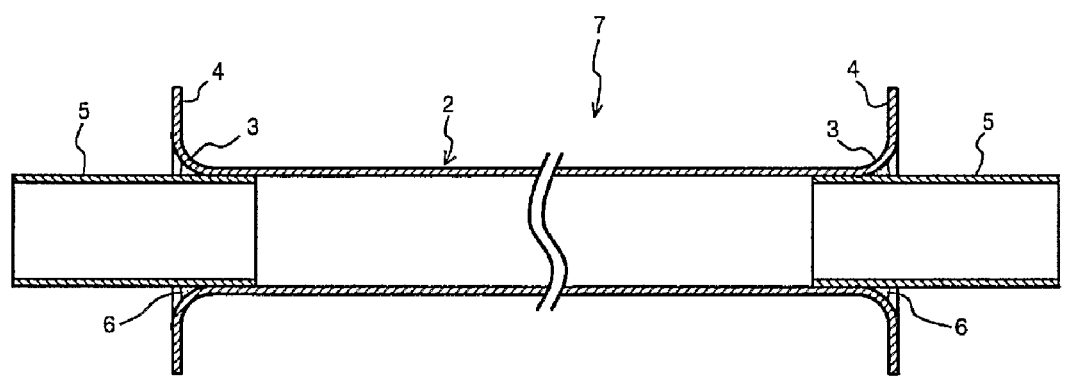
FIG. 4 is a sectional side view of the cross member assembly comprising the afore-mentioned cross member and extension members.

The cross member 2 is preferably a tubular member having a flange 4 that is formed integrally at both ends thereof via a flare 3. Flange 4 extends circumferentially about the end of the cross member. The flare 3 is formed by smoothly bending outwards the end of the cross member 2 through 90° in the radial direction, and the flange 4 is formed integrally with the flare 3 and extended to the vicinity of a bend 12 (explained later). As also shown in FIG. 4, cylindrical extension members 5 are inserted and press fitted into the ends of the cross member 2 provided with the flares 3 and the flanges 4 to the prescribed depth to project outwards from the flanges 4 lengthwise of the cross member and in the lateral direction of the vehicle. The extension member 5 is welded at the bend of the flare 3 around its periphery, thus forming the first weld bead 6 shown in FIG. 2 and FIG. 4.

As shown in FIG. 1 and FIG. 2, side member 1 has a closed cross-sectional part 8, preferably box shaped. The closed cross-section part 8 may be provided along the entire length of the side member 1 in the longitudinal direction, however, it need only be provided at the location wherein the cross member 2 is attached. The closed-section part 8 is formed in a rectangular cross-sectional shape comprising an inside part 8$i$ in the lateral direction of the vehicle, an outside part 8$o$ in the lateral direction of the vehicle, a top part 8$u$, and a bottom part 8$d$. Inside hole 9$i$ and outside hole 9$o$ where the afore-mentioned extension member 5 is inserted are formed in the inside part 8$i$ in the lateral direction of the vehicle and the outside part 8$o$ in the lateral direction of the vehicle respectively. The inside hole 9$i$ is formed to a diameter greater than the outside diameter of the extension member 5, and the outside hole 9$o$ is formed to a diameter matching the outside diameter of the extension member 5.

The afore-mentioned cross member assembly 7 is joined (welded) to the side member 1 as follows. The extension member 5 of the cross member assembly 7 is passed through inside hole 9$i$ and outside hole 9$o$, until the flange 4 abuts against the inside part 8$i$. The cross member assembly 7 is placed in a jig to hold it in position in relation to the side member 1. Since inside hole 9$i$ is larger than the outside diameter of extension member 5, ease of work is improved when passing through. A distal end of extension member 5 frictionally fits within outside hole 9$o$. In this condition, the outer periphery of the flange 4 is welded in the peripheral direction to the inside part 8$i$ by second weld bead 10. A third weld bead 11 is formed by welding the extension member to the outside part 8$o$.

According to the afore-mentioned joining structure, the first weld bead 6 is formed on the flare 3, in other words, on a part where the end of cross member 2 is bent and having high rigidity, and thus occurrence of deformation based on the afore-mentioned inputs is inhibited. Furthermore, since the first weld bead 6 is located on the inside of the cross member 2, stress occurring due to the afore-mentioned various inputs is less than with the first weld bead w1' located on the outside of the cross member c in the type in FIG. 10 and FIG. 11. As a result, stress concentration of the first weld bead 6 is alleviated, and occurrence of cracking in the first weld bead 6 is suppressed. In other words, according to the present embodiment, parts equivalent to the first weld bead w1' being a dangerous site in terms of strength (sites wherein the possibility of cracking due to stress concentration is high) in the type in FIG. 11, are eliminated.

Figure 10:
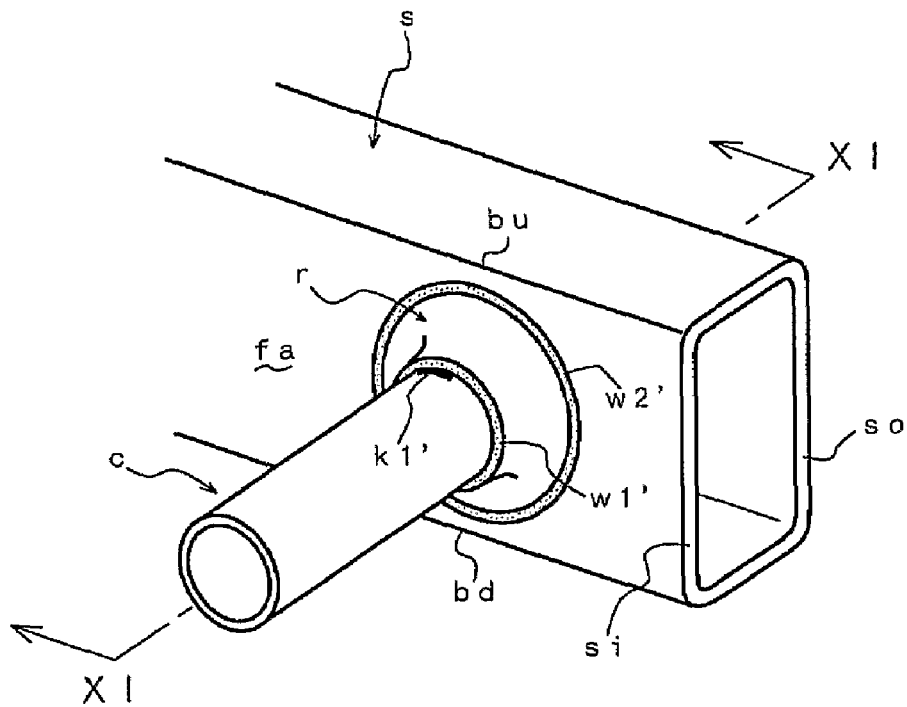
FIG. 10 is a perspective view showing the joining structure for side members and cross members previously developed by the inventor.
Figure 11:
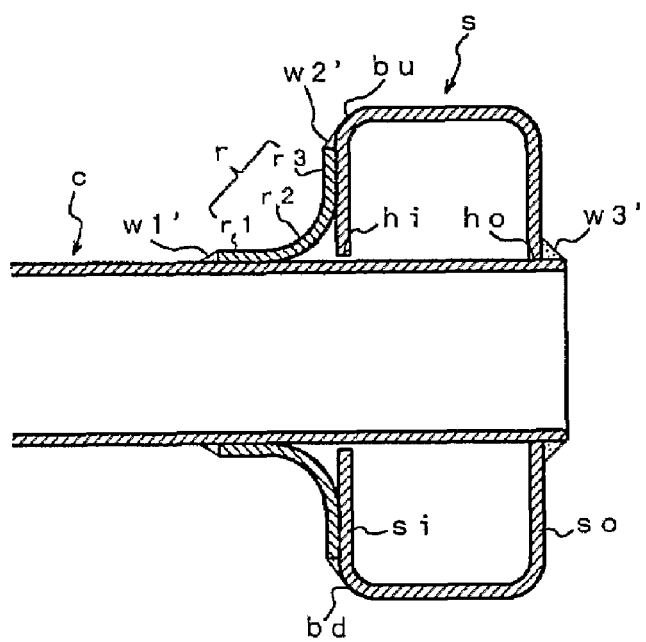
FIG. 11 is a cross-sectional view taken along XI-XI in FIG. 10.

Furthermore, in relation to the second weld bead 10, occurrence of cracking based on the afore-mentioned various inputs is suppressed for the same reason as the second weld bead w2' in FIG. 10 and FIG. 11 explained previously. In other words, the top and bottom of the second weld bead 10 are located near the top and bottom bends 12 of side member 1, and since occurrence of deformation based on the afore-mentioned inputs is inhibited, occurrence of cracking in the second weld bead 10 can be suppressed by suppressing progression of stress concentration based on deformation of the parent material (side member 1) in the second weld bead 10, absorption of load by deformation of the flare 3, and by an ability to alleviate stress occurring with increased length of the second weld bead 10. Sufficient length of the top and bottom of this second weld bead 10 may be ensured near the bend 12 at top and bottom of side member 1 by forming the flange 2 in a rectangular shape having greater length in the top-bottom direction.

Figure 2A:
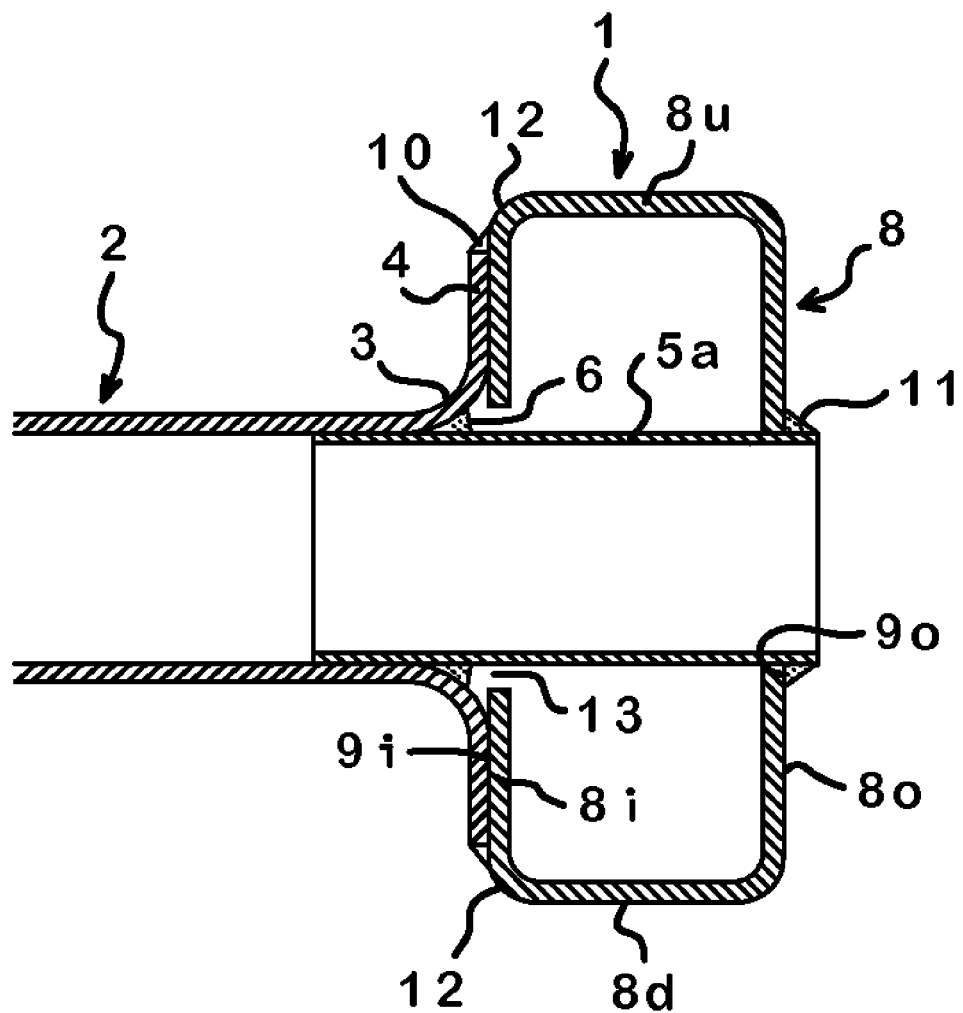
FIG. 2a is a cross-sectional view of an alternate joining structure.
Figure 3:
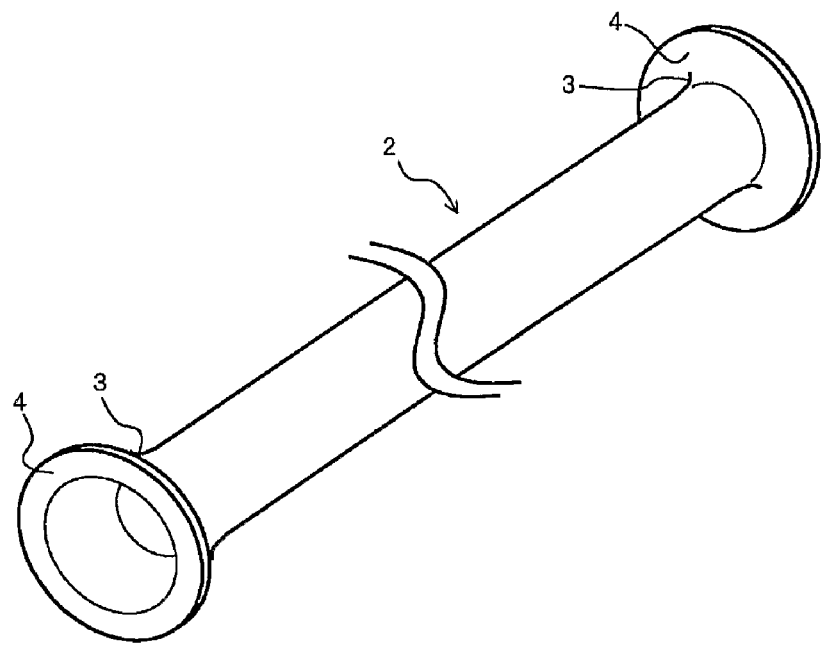
FIG. 3 is a perspective view of the afore-mentioned cross member.

In relation to the third weld bead 11, the majority of the force transmitted from the cross member 2 to the side member 1 due to the afore-mentioned inputs is distributed by the second weld bead 10 being of sufficient length, and the stress on the third weld bead 11 is reduced, and thus occurrence of cracking in the third weld bead 11 is suppressed. While the second weld bead 10 directly joins the flange 4 formed integrally in the cross member 2 and side member 1, the third weld bead 11 indirectly joins cross member 2 and side member 1 via extension member 5, and thus the force transmitted from the cross member 2 to the side member 1 applies a greater load to the second weld bead 10 directly than is applied to the third weld bead 11 indirectly via the extension member 5. The second weld bead 10 is long (weld surface area is greater) and thus stress is reduced and cracking does not occur. On the other hand, the third weld bead 11 is short and the force applied therein is small, and thus the stress occurring is small and cracking does not occur. The plate thickness of extension member 5 is determined in accordance with the degree of rigidity required, however in many cases it is less than the plate thickness of the cross member 2, as shown in FIG. 2a and identified as extension member 5a.

Thus, according to the joining structure for the side member 1 and the cross member 2 of the present embodiment, in relation to the first weld bead 6 and the second weld bead 10, the plate is welded near the flare 3 and the bend 12, respectively, close to the part where the plate is bent and having a rigidity greater than the flat part, and thus deformation due to the afore-mentioned various inputs is reduced and progression of stress concentration is suppressed, and occurrence of cracking is suppressed. In relation to the third weld bead 11, the majority of the force transmitted from the cross member 2 to the side member 1 is distributed over the second weld bead 10 having greater weld length, stress in the third weld bead 11 is alleviated, and occurrence of cracking in the third weld bead 11 is suppressed.

Figure 8:
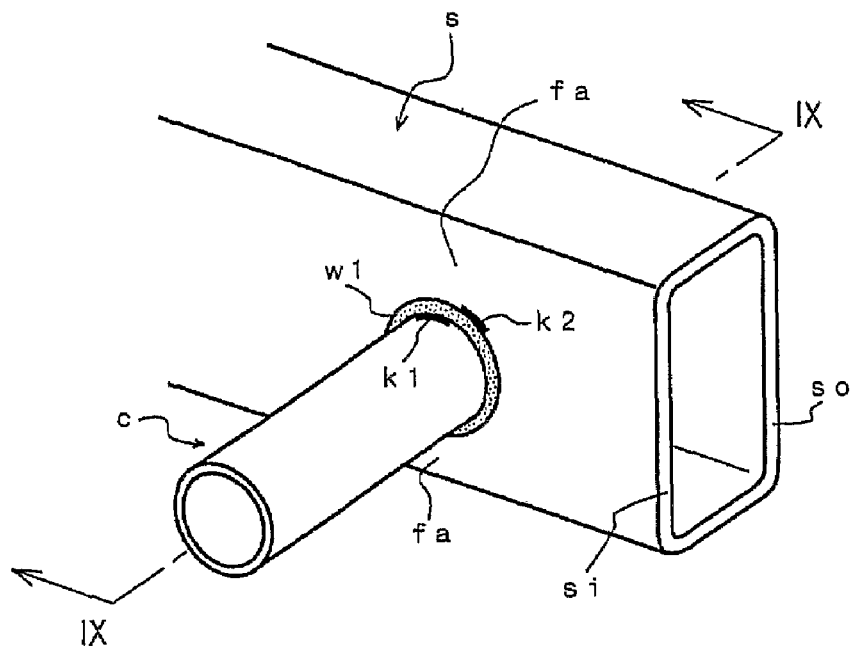
FIG. 8 is a perspective view showing a joining structure for side members and cross members of a chassis frame according to a conventional example.
Figure 9:
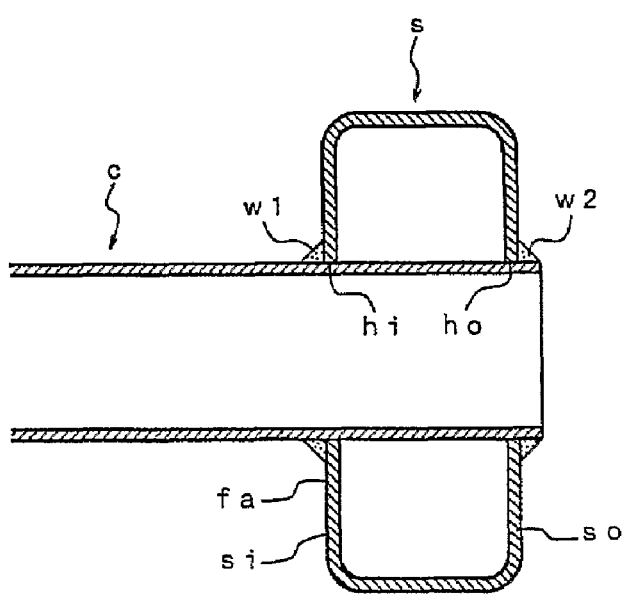
FIG. 9 is a cross-sectional view taken along IX-IX in FIG. 8.

In relation to the joined strength of the side member 1 and the cross member 2, the first weld bead 6 is welded to the flare 3 where the plate is bent through 90°, and thus, as shown in FIG. 10 and FIG. 11, the contact area of the bead with the parent material increases to a greater extent than the first weld bead w1' welded to the peripheral face of the cross member c, and joined strength increases. Since the second weld bead 10 is formed on the outer periphery of the flange 2, the welded area becomes greater than that of the first weld bead w1 shown in FIG. 8 and FIG. 9, and joined strength increases.

In other words, according to the joining structure for the side member 1 and the cross member 2 according to the present embodiment, dangerous sites in terms of strength (areas of weakness) can be eliminated without loss of joining rigidity, and thus occurrence of cracking in welds 6, 10, and 11 due to the inputs during running of the vehicle can be suppressed. As a result, the chassis frame adopted in the afore-mentioned joining structure can maintain the prescribed rigidity and strength with thinner plate thickness than the types in FIG. 8 through FIG. 11, and can provide chassis frames lighter in weight with lower cost.

Figure 5:
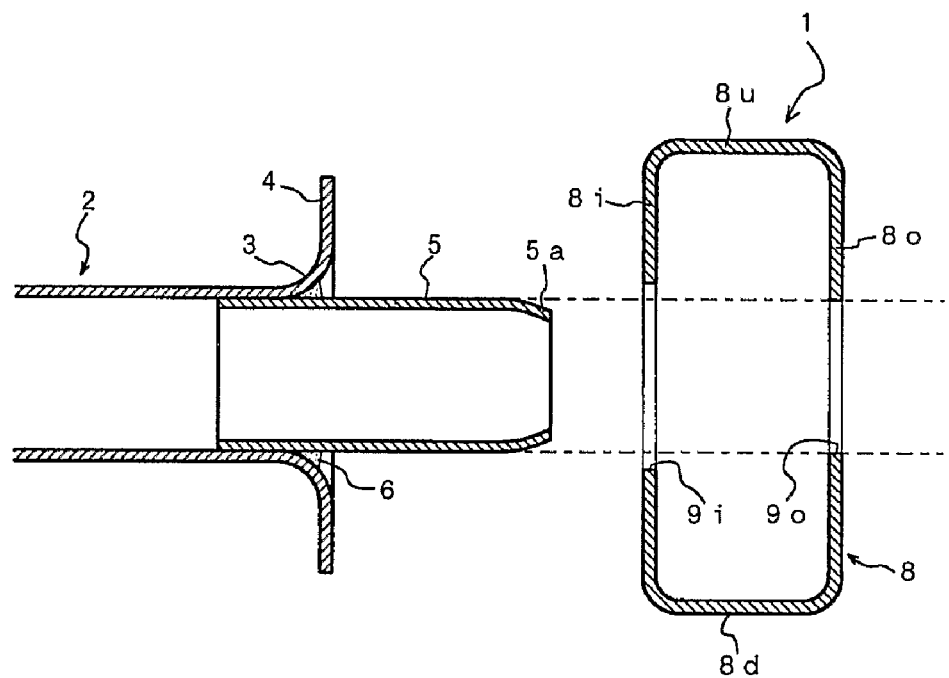
FIG. 5 is a cross-sectional view of a variation of the afore-mentioned joining structure.

In the modification shown in FIG. 5, the tip 5a of the afore-mentioned extension member 5 is gradually reduced in diameter towards the outside in the width direction of the vehicle. By reducing the diameter in this manner, ease of inserting extension member 5 into the afore-mentioned outside hole 9o is improved.

Figure 6:
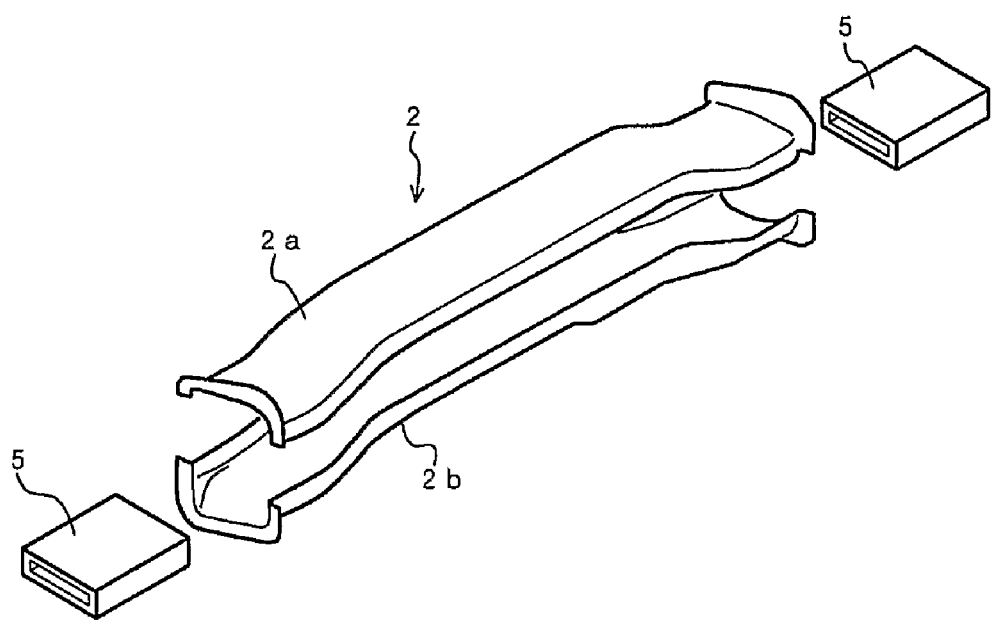
FIG. 6 is a perspective view of a modification of the afore-mentioned cross member assembly.

In the modification shown in FIG. 6, the cross member 2 is manufactured by assembling parts 2a and 2b having the shape of a pipe split in two. The afore-mentioned parts 2a and 2b are formed by a pressing process and the like.

Furthermore, the cross member 2 is not limited to a member of cylindrical shape as shown in the figure, and may be a member wherein the central part is of an open U-shape. Furthermore, the side member 1 is not limited to a pipe material as shown in the figure, and may be formed from two pieces of materials of U-shaped cross-section assembled one above the other or side by side.

Furthermore, the joining structure according to the afore-mentioned embodiments may be applied to either all of the cross members 2 or some of cross members 2 of the chassis frame.

The foregoing specific embodiments have been provided to illustrate the structural and functional principles of the present invention, and are not intended to be limiting. To the contrary, the present invention is intended to encompass all modifications, alterations, and substitutions within the scope of the appended claims.

What is claimed is:

1. A structure for joining a cross member to a side member of a chassis frame, comprising:
   a cross member having a flared flange integrally formed at an end of the cross member and extending circumferentially thereabout;
   an extension member inserted into the end of the cross member to project lengthwise of the cross member, and said extension member welded to the cross member; and
   a side member having a closed cross section, said closed cross section having an inside hole formed in an inside part of the side member and an outside hole formed in an outside part of the side member wherein the extension member is passed through the inside hole and the outside hole and welded to outside part of the side member, and the flange is welded to the inside part of the side member, wherein the inside hole has a size greater than an outside periphery of the extension member; and a prescribed clearance is formed between the extension member and the inside hole.

2. The structure for joining a cross member to a side member in a chassis frame according to claim 1, wherein said inside hole has a size greater than said outside hole.

3. The structure for joining a cross member to a side member in a chassis frame according to claim 1, wherein the extension member is tapered.

4. The structure for joining a cross member to a side member in a chassis frame according to claim 3, wherein a distal end of said extension member frictionally fits within said outside hole.

5. The structure for joining a cross member to a side member in a chassis frame according to claim 1, wherein the extension member has a plate thickness less than a plate thickness of the cross member.

6. The structure for joining a cross member to a side member in a chassis frame according to claim 1, wherein the closed cross section part is a rectangular shape; and the top and bottom parts of the periphery of the flange are located near top and bottom corners of the rectangular shape.

7. The structure for joining a cross member to a side member in a chassis frame according to claim 1, wherein the extension member is welded about its periphery to said cross member to form a first bead.

8. The structure for joining a cross member to a side member in a chassis frame according to claim 1, wherein the flange is welded about its periphery to the inside part of the side member to form a second bead.

9. The structure for joining a cross member to a side member in a chassis frame according to claim 1, wherein the extension member is welded about its periphery to the outside part of the side member to form a third bead.

10. A chassis frame comprising:
a one-piece cross member having a first flared flange portion integrally formed at a first end of the cross member;
a first extension member inserted into the first end of the cross member to project lengthwise of the cross member, and said first extension member welded to the cross member; and
a first side member having a closed cross section, said closed cross section having an inside hole formed in an inside part of the first side member and an outside hole formed in an outside part of the first side member wherein the first extension member is passed through the inside hole and the outside hole and welded to outside part of the first side member; and the first flange is welded to the inside part of the first side member.

11. The chassis frame according to claim 10, wherein the cross member has a second flared flange at second end thereof and a second extension member is welded to the second end and said chassis having a second side member having a closed cross section, said closed cross section having an inside hole formed in an inside part of the second side member and an outside hole formed in an outside part of the second side member wherein the second extension member is passed through the inside hole and the outside hole and welded to outside part of the second side member, and a periphery of the second flange is welded to the inside part of the second side member.

12. A method for joining cross members to side members in a chassis frame comprising the steps of:

forming a first flange integrally at a first end of a cross member;
inserting a first extension member into the first end of the cross member to project lengthwise from the cross member,
welding the first extension member to the cross member;
providing a first side member having a closed cross-section;
forming an inside hole in an inside part of the first side member and an outside hole formed in an outside part of the first side member;
passing the first extension member through the inside hole and through the outside hole, wherein the inside hole is sized to define a prescribed clearance between the first extension member and the inside hole;
welding the first extension member to the outside part of the first side member; and
welding the first flange to the inside part of the first side member.

13. The method for joining cross member to side members in a chassis frame according to claim 12, wherein the inside hole is formed with a diameter larger than a diameter of said outside hole.

14. The method for joining cross members to side members in a chassis frame according to claim 13, wherein the closed cross-section is a rectangular shape; and top and bottom parts of the periphery of the flange are located near top and bottom bends forming the closed cross-section.

15. The method for joining cross members to side member of a chassis frame according to claim 12, wherein the method further comprises:
forming a second flange integrally at a second end of the cross member, opposite said first end;
inserting a second extension member into the second end of the cross member to project lengthwise from the cross member,
welding the second extension member to the cross member;
providing a second side member having a closed cross-section;
forming an inside hole in an inside part of the second side member and an outside hole formed in an outside part of the second side member;
passing the second extension member through the inside hole and through the outside hole;
welding the second extension member to the outside part of the second side member; and
welding the second flange to the inside part of the second side member.

16. The method for joining cross members to side member of a chassis frame according to claim 12, wherein each of said welding steps comprises welding about a periphery of the first and second extension members and about a periphery of said first and second flanges.

* * * * *